United States Patent
York et al.

(10) Patent No.: US 6,779,769 B1
(45) Date of Patent: Aug. 24, 2004

(54) MULTI-PURPOSE HOLDER INSTALLED IN A VEHICLE

(75) Inventors: Robb York, Lake Orion, MI (US); James E. Carl, Sterling Heights, MI (US)

(73) Assignee: Lear Corporation, Southfield, MI (US)

(*) Notice: Subject to any disclaimer, the term of this patent is extended or adjusted under 35 U.S.C. 154(b) by 0 days.

(21) Appl. No.: 10/218,611

(22) Filed: Aug. 14, 2002

(51) Int. Cl.⁷ .............................................. A47K 1/08
(52) U.S. Cl. ................................. 248/311.2; 224/926
(58) Field of Search ............................ 248/311.2, 312, 248/309.1, 313; 224/926; 297/188.01

(56) References Cited

U.S. PATENT DOCUMENTS

| | | | | |
|---|---|---|---|---|
| 4,738,423 A | * | 4/1988 | DiFilippo et al. | 248/311.2 |
| 4,792,184 A | | 12/1988 | Lindberg et al. | |
| 4,943,111 A | | 7/1990 | VanderLaan | |
| 5,195,711 A | | 3/1993 | Miller et al. | |
| 5,297,767 A | | 3/1994 | Miller et al. | |
| 5,445,350 A | | 8/1995 | Rigsby | |
| 5,628,486 A | | 5/1997 | Rossman et al. | |
| 5,673,890 A | | 10/1997 | Duesterberg | |
| 5,673,891 A | | 10/1997 | Fujihara et al. | |
| 5,704,579 A | | 1/1998 | Celentino et al. | |
| 5,800,011 A | | 9/1998 | Spykerman | |
| 5,839,711 A | | 11/1998 | Bieck et al. | |
| 5,857,633 A | | 1/1999 | Pelchat, II et al. | |
| 5,865,411 A | * | 2/1999 | Droste et al. | 248/311.2 |
| 5,890,692 A | * | 4/1999 | Lee et al. | 248/311.2 |
| 5,921,519 A | | 7/1999 | Dexter et al. | |
| 5,997,082 A | * | 12/1999 | Vincent et al. | 297/188.19 |
| 6,019,334 A | * | 2/2000 | Shinomiya | 248/311.2 |
| 6,092,776 A | | 7/2000 | You | |
| 6,189,755 B1 | | 2/2001 | Wakefield | |
| 6,206,260 B1 | | 3/2001 | Covell et al. | |
| 6,253,975 B1 | | 7/2001 | Ichioka et al. | |
| 6,349,913 B1 | | 2/2002 | Jankowski | |
| 6,409,136 B1 | * | 6/2002 | Weiss et al. | 248/311.2 |
| 6,450,468 B1 | * | 9/2002 | Hamamoto | 248/311.2 |
| 6,464,187 B1 | * | 10/2002 | Bieck et al. | 248/311.2 |
| 2002/0008415 A1 | | 1/2002 | Bollaender et al. | |

* cited by examiner

*Primary Examiner*—Leslie A. Braun
*Assistant Examiner*—Amy J. Sterling
(74) *Attorney, Agent, or Firm*—Bill C. Panagos

(57) ABSTRACT

A multi-purpose holder for supporting an object in a vehicle includes a first support member defining an opening for receiving an object. The first support member has a first contact surface for supporting an object. A second support member is pivotally mounted on the first support member, and preferably has a second contact surface spaced apart from a third contact surface. The second and third contact surfaces further support the object. The second support member is pivotal so as to alter the position of the second and third contact surfaces such that the second and third contact surfaces support, in cooperation with the first contact surface, objects having different diameters. The second support member includes a pair of support arms. The support arms are spaced apart a distance and define substantially parallel support surfaces.

15 Claims, 6 Drawing Sheets

MULTI-PURPOSE HOLDER INSTALLED IN A VEHICLE

TECHNICAL FIELD

This invention relates to a holder for supporting an object. More particularly, the invention relates to a multi-purpose holder for supporting an object in a vehicle.

BACKGROUND OF THE INVENTION

Vehicle interiors typically include a variety of decorative and functional trim panels. For example, the front area of the interior of a vehicle, generally referred to as the cockpit area, includes an instrument panel, typically formed of a molded plastic material. Vehicles also may include a center console located between the driver and passenger seats for storage and placement of various articles. The instrument panel and/or center console can include a variety of devices for holding beverage containers, typically known as cup holders. Known cup holders typically are adapted to hold known beverage containers, such as cans, cups, and bottles. However, there has developed a desire on the part of vehicle occupants to store other articles or objects in a vehicle such that the objects are within easy reach of the occupant. Vehicle occupants therefore often store objects other than beverage containers in the cup holder for periodic retrieval. Such items are known to move within the cup holder when the vehicle is in motion, and are known to fall from the cup holder. The objects stored within the cup holder box can be susceptible to damage as a result of such falling.

It would be advantageous if there could be developed an improved holder for supporting differently shaped articles or objects in a vehicle.

SUMMARY OF THE INVENTION

This invention relates to a multi-purpose holder for supporting an object in a vehicle. The multi-purpose holder includes a first support member defining an opening for receiving an object. The first support member has a first contact surface for supporting the object. A second support member is pivotally mounted on the first support member, and preferably has a second contact surface spaced apart from a third contact surface. The second and third contact surfaces further support the object. The second support member is pivotal so as to alter the position of the second and third contact surfaces such that the second and third contact surfaces support, in cooperation with the first contact surface, objects having different diameters. The second support member includes a pair of support arms. The support arms are spaced apart a distance and define substantially parallel support surfaces.

Various objects and advantages of this invention will become apparent to those skilled in the art from the following detailed description of the preferred embodiment, when read in light of the accompanying drawings.

DETAILED DESCRIPTION OF THE INVENTION

Figure 1:
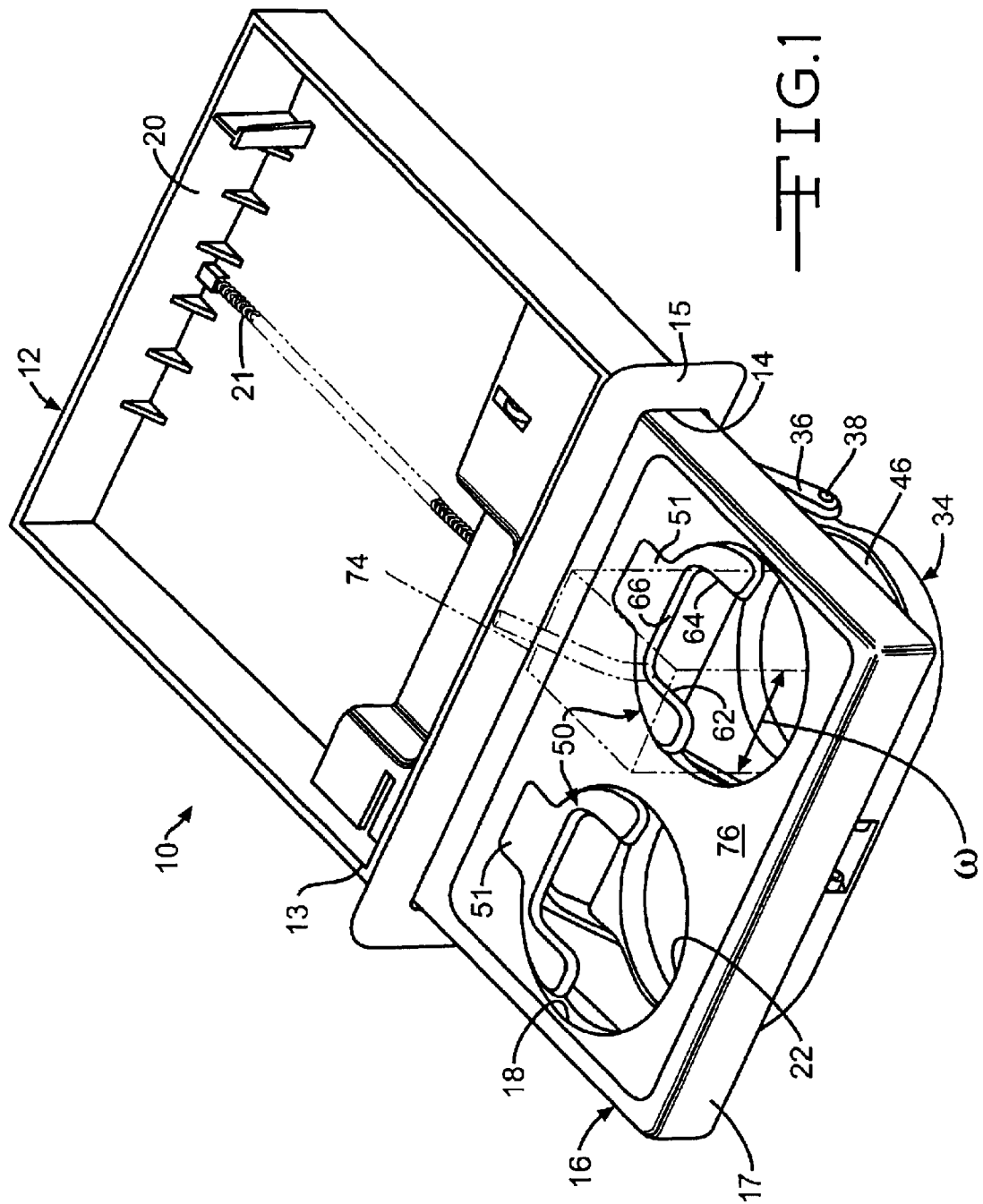
FIG. 1 is a perspective view of a multi-purpose holder according to the invention showing the upper platform in the deployed position.

As shown in FIG. 1, a multi-purpose holder for supporting an object according to the invention is illustrated generally at 10. The holder 10 includes a housing 12 adapted to be mounted within a vehicle, such as an automobile, a boat, or an airplane. The housing 12 may be of any desired type and located at any desired position in the vehicle. The housing 12 includes a front portion 13, an opening 14 defined in the front portion 13, and an ornamental or decorative surface 15 surrounding the opening 14. The decorative surface 15 can have any desired aesthetically pleasing color and texture. Preferably, the housing 12 is mounted within an opening in a portion of the vehicle, such as a trim panel, console, or an instrument panel. The housing 12 may be attached to the vehicle by any desired means, such as threaded fasteners or with adhesive.

Figure 2:
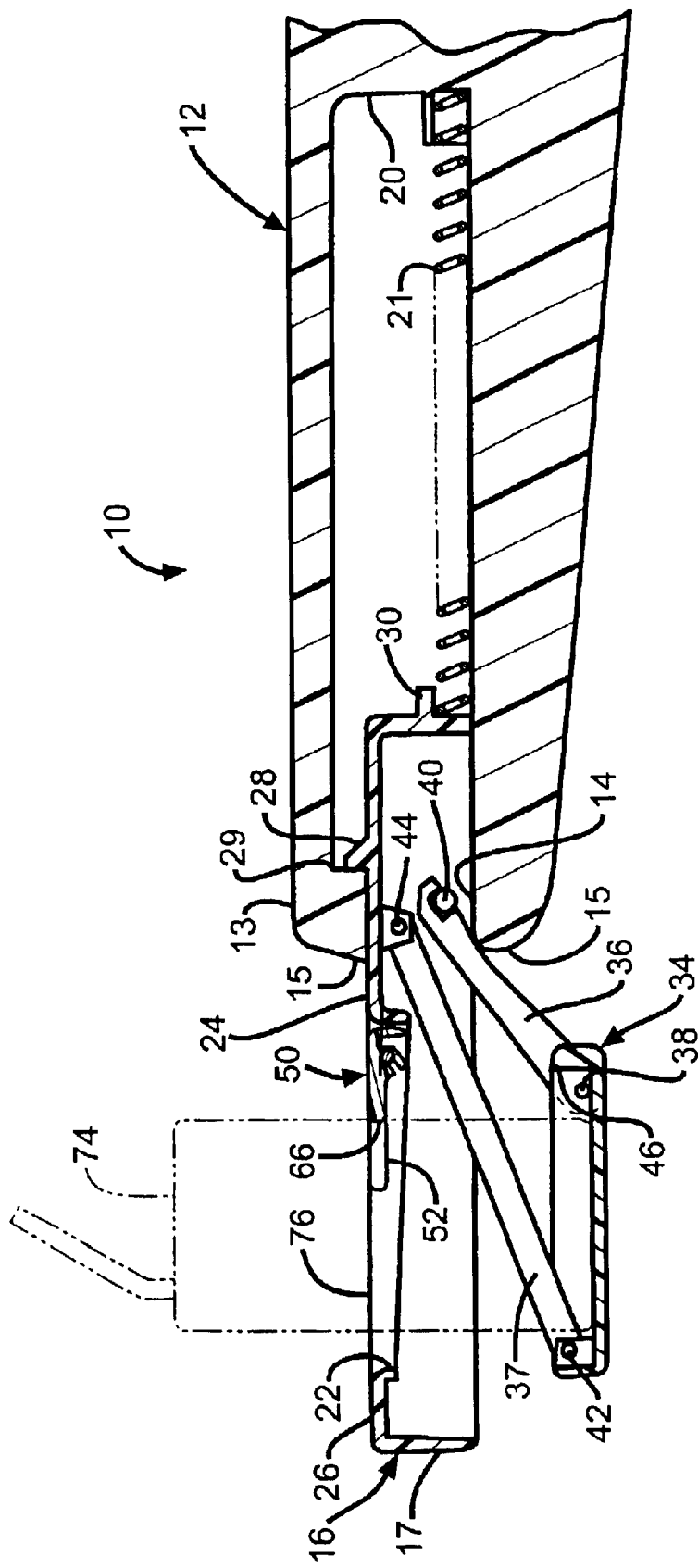
FIG. 2 is a cross sectional view in elevation of the multi-purpose holder illustrated in FIG. 1 showing the upper platform in the deployed position.
Figure 3:
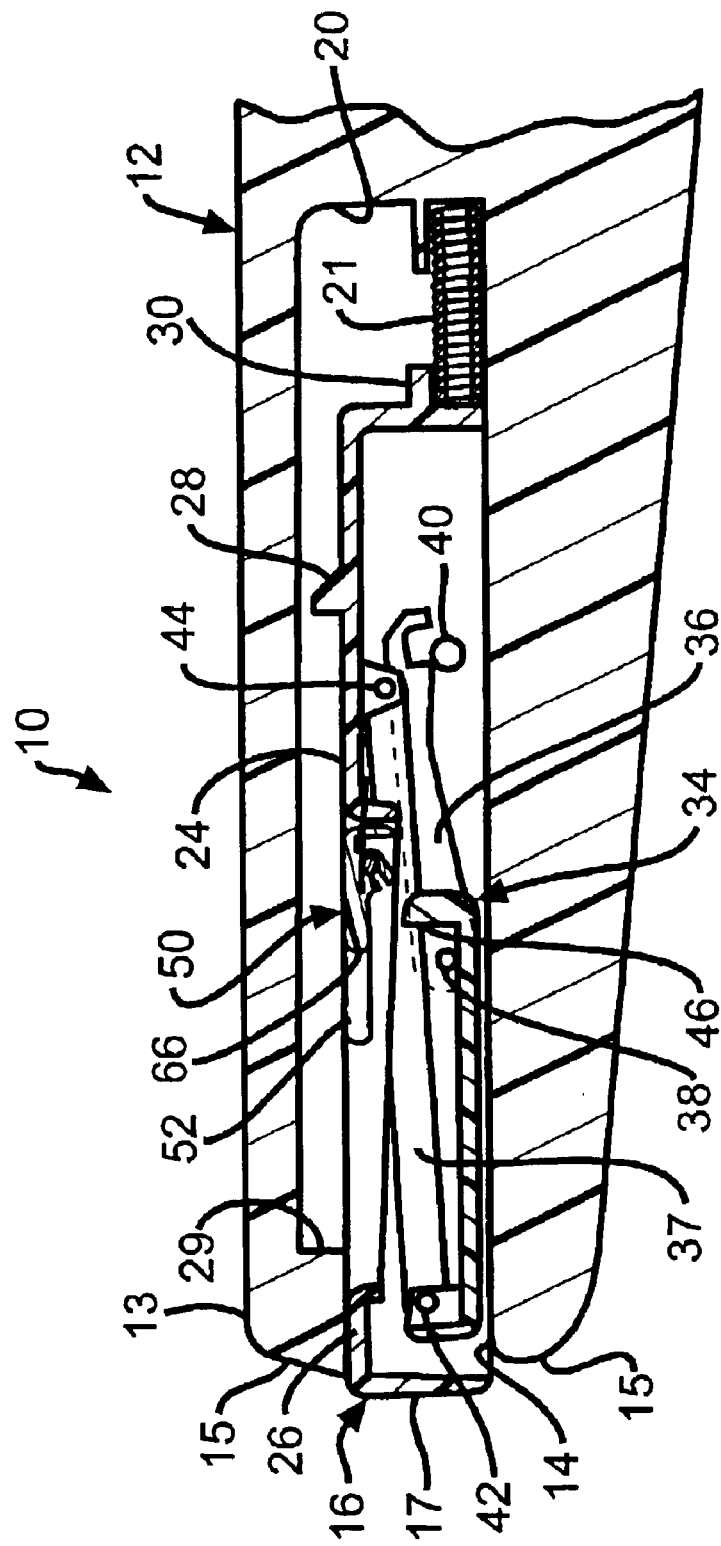
FIG. 3 is a is a cross sectional view in elevation of the multi-purpose holder illustrated in FIGS. 1 and 2 showing the upper platform in the stored position.

The opening 14 of the housing 12 accommodates a first support member or upper platform 16. The upper platform 16 is slidably mounted within the housing 12 so that the upper platform 16 may be concealed within the housing 12 and thereby hidden from view when not in use. The upper platform 16 can be drawn outwardly from the housing 12 to a deployed position, as shown in FIGS. 1 and 2, and pushed inward into the opening 14 of the housing 12 to a stored position, as shown in FIG. 3.

The upper platform 16 includes a front face 17, and at least one object support opening 18 having an opening edge or wall, a portion of which defines a first contact surface 22 for supporting an object, as will be explained in detail below. Preferably, the object support opening 18 is substantially cylindrical, although such is not required. The object support opening 18 can have any desired shape. The front face 17 is preferably ornamental or decorative and can have any desired aesthetically pleasing color and texture. FIG. 1 shows two object support openings 18 within the upper platform 16, however, the upper platform 16 may have any desired number of object support openings 18, such as one opening or more than two openings.

The housing 12 includes a spring mechanism for urging the upper platform 16 outwardly from a rear wall 20 of the housing 12. As used herein, a spring is defined as any suitable mechanism for biasing or urging one object toward, or away from, another object. In the embodiment illustrated, the spring mechanism for urging is a coil spring 21, although such a spring is not required. Any desired mechanism for urging the upper platform 16 away from the rear wall 20 may be used.

The upper platform 16 can be retained in the stored position when pushed into the housing 12 against the force of the spring 21 by any desired locking device. Preferably, the upper platform 16 is retained in the stored position in the housing 12 by a spring biased push-open mechanism, although a push-open mechanism is not required. In such a push-open mechanism, the upper platform 16 can be unlocked, or moved from the stored position to the deployed position, by lightly pressing the upper platform 16 further into the housing 12. The push-open mechanism is familiar to one skilled in the art, and will not be described in greater detail herein.

The upper platform 16 includes a rear portion 24 and a front portion 26, as shown in FIG. 2. The rear portion 24 includes at least one protrusion or stop 28 formed on an upper surface of the rear portion 24. The stop 28 abuts against a rear edge 29 of the decorative surface 15 and prevents the upper platform 16 from separating from the housing 12. A retainer 30 extending rearwardly from the rear portion 24 can be provided for retaining the spring 21. Preferably, the retainer 30 is integrally formed with the rear portion 24 of the upper platform 16, however such is not required.

A lower platform 34 can be provided for supporting a lower portion of an object supported by the upper platform 16. The lower platform 34 is connected to the upper platform by first platform arms 36 and a second platform arm 37. Preferably two first arms 36 are provided at opposite outer sides of the upper platform 16. Any desired number of first and second platform arms 36 and 37 can also be provided. The second arm 37 is preferably provided intermediate the first arms 36. Lower ends of the first arms 36 are pivotally connected to the lower platform 34 by a first pivot pin 38. The first arms 36 extend upwardly and rearwardly. Upper ends of the first arms 36 are pivotally connected to the rear portion 24 of the upper platform 16 by a second pivot pin 40. A lower end of the second arm 37 is pivotally connected to the lower platform 34 by a third pivot pin 42. The second arm 37 extends upwardly and rearwardly, and is pivotally connected to the rear portion 24 of the upper platform 16 by a fourth pivot pin 44. Accordingly, the lower platform 34 is vertically movable between the deployed position, as shown in FIGS. 1 and 2, and the stored position, as shown in FIG. 3.

FIGS. 2 and 3 show the relative positions of the arms 36 and 37 when the upper platform 16 is deployed, and when the upper platform 16 is stored, respectively. From the deployed position, the front face 17 of the upper platform 16 can be pushed rearwardly such that the upper platform 16 is inserted into the housing 12. As the arms 36 and 37 contact the surface 15 of the housing 12, the arms pivot clockwise about the pivot pins 40 and 44, respectively. The lower platform 34 is thereby lifted upwardly such that the lower platform 34 is nested within the upper platform 16, as viewed in FIG. 2. Such upward lifting and nesting of the lower platform 34 allows the upper platform 16 to easily slide into the stored position, as shown in FIG. 3.

One or more of the first and second arms 36 and 37 can be downwardly biased, although such biasing is not required. If desired, biasing means, such as a torsion spring, can be attached to the arms 36 and 37 at pivot pins 40 and 44, respectively. The upper and lower platforms 16 and 26 can be moved between the deployed position, as shown in FIG. 2, and the stored position, as shown in FIG. 3. Although the lower platform 26 is shown as being a movable platform, the lower platform 26 need not be movable. For example, the lower platform 26 can be a surface formed or mounted within the object support opening 18 of the upper platform 16.

The lower platform 34 can include one or more recesses 46 for receiving an object, as shown in FIGS. 1 and 2. Preferably, the recesses 46 correspond to each object support opening 18, and are substantially cylindrical, although such is not required. The recesses 46 can also have any desired shape.

Figure 5:
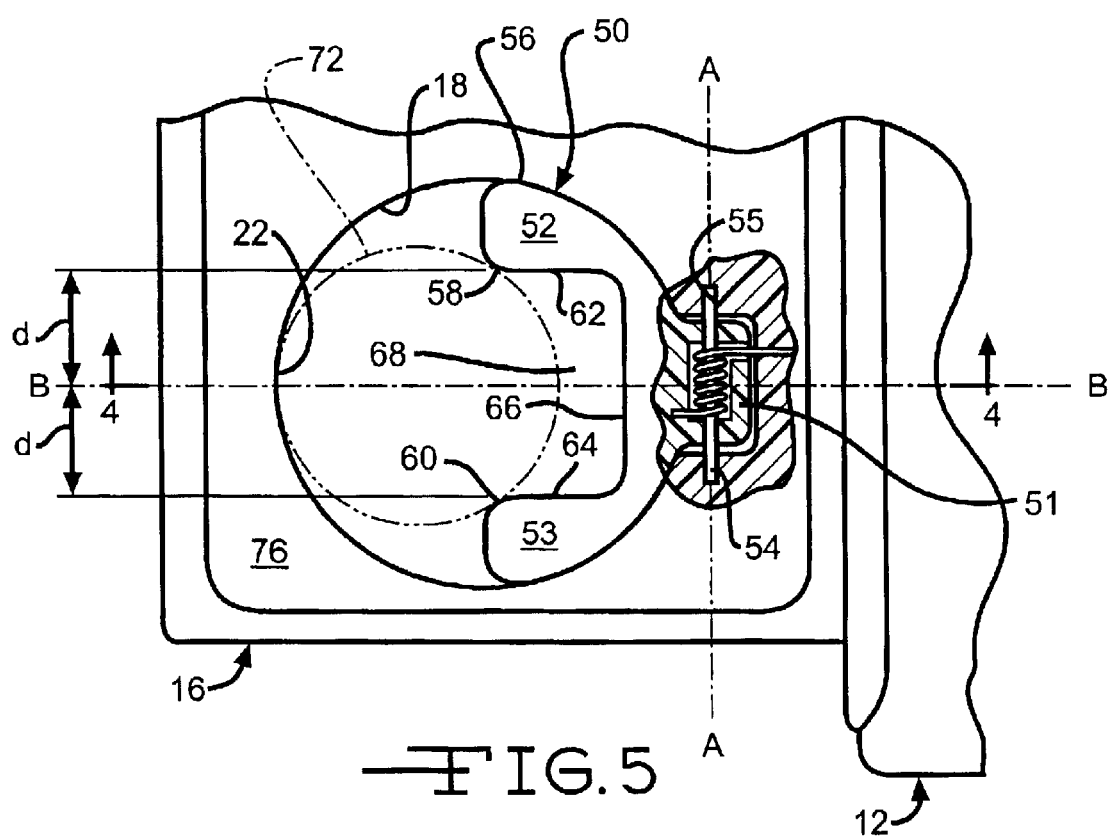
FIG. 5 is a partial plan view, partially in cross section, of an object support opening illustrated in FIG. 1 showing the second support member.

As best shown in FIGS. 1 and 5, a second support member 50 is provided within each object support opening 18. A rear portion 51 of the second support member 50 is preferably pivotally mounted to the upper platform 16 by a fifth pivot pin 54. The fifth pivot pin 54 has a longitudinal axis A generally parallel with the plane of an upper surface 76 of the upper platform 16, and is mounted within corresponding pin receiving apertures formed in the upper platform 16 and second support member 50, respectively. It will be appreciated that the fifth pivot pin 54 can be formed or mounted on the second support member 50 and received in a corresponding receiving aperture 55 in the upper platform 16. Alternately, the fifth pivot pin 54 can be formed or mounted on the upper platform 16 and received in a corresponding receiving aperture in the second support member 50.

As shown in FIGS. 1 and 5, the second support member 50 preferably includes an outer peripheral wall 56 having a desired shape. Preferably, the outer peripheral wall 56 has a shape corresponding to the shape of the object support opening 18. However, the shape of the outer peripheral wall 56 need not correspond to the shape of the object support opening 18. The second support member 50 includes second and third contact surfaces, 58 and 60, respectively. Preferably, the second contact surface 58 is spaced apart from the third contact surface 60. The purpose of the second and third contact surfaces 58 and 60 will be explained below.

The second support member 50 has a central axis B substantially perpendicular to the longitudinal axis A. A pair of arms 52 and 53 extend outwardly from the rear portion 51 of the second support member 50. The arms 52 and 53 include substantially parallel support surfaces 62 and 64. The support surfaces 62 and 64 are preferably spaced an equal distance d from the central axis B. However, the support surfaces 62 and 64 may be spaced at any desired distance from the central axis B, and from each other. The rear portion 51 can include a third support surface 66. The third support surface 66 is preferably substantially perpendicular to the first and second support surfaces 62 and 64, thereby forming an open ended notch 68 having a substantially rectangular shape. In the illustrated embodiment, the second support member 50 is substantially wishbone-shaped, although such is not required.

The second support member 50 can be formed from any desired substantially rigid material, such as plastic. Polystyrene is a preferred material for the second support member 50 because of its strength and rigidity.

Figure 4A:
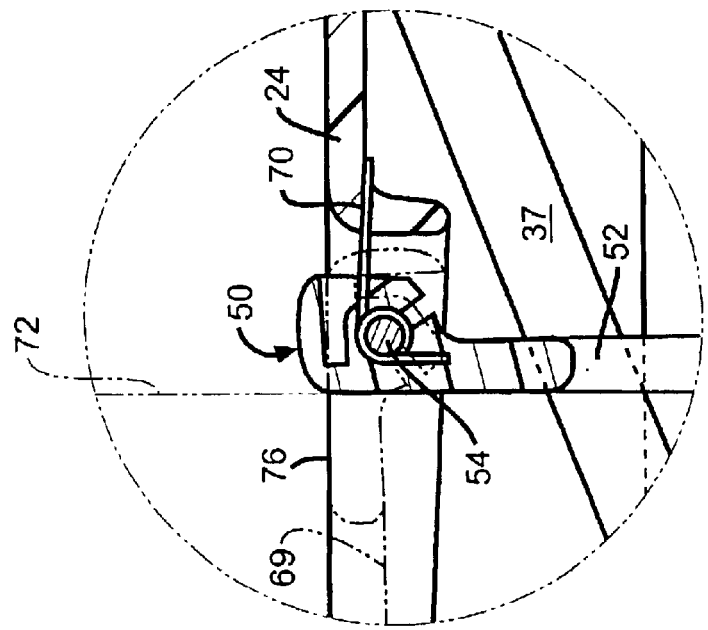
FIG. 4A is an enlarged cross sectional view of the second support member illustrated in FIG. 1.
Figure 4:
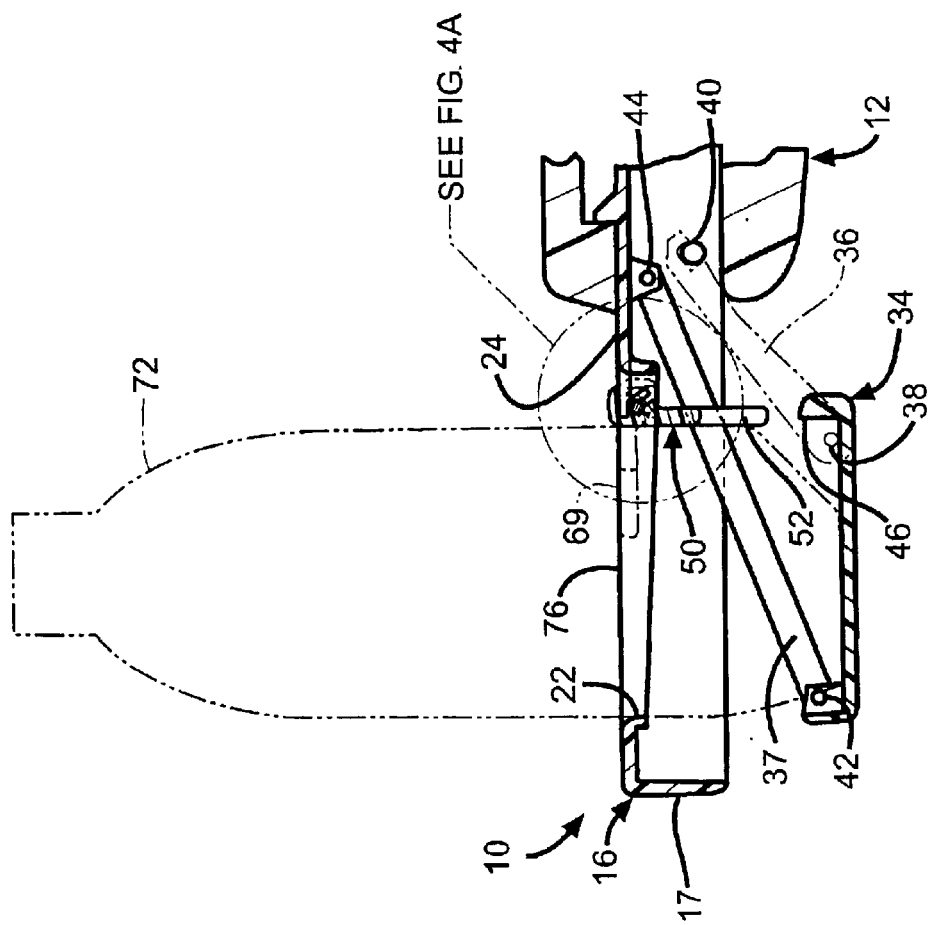
FIG. 4 is a cross sectional view, taken along line 4—4 of FIG. 5, of the upper and lower platforms illustrated in FIG. 1 showing the second support member in the lower position.

Preferably, the second support member 50 is urged into a horizontal or upper position extending toward the center of the object support opening 18 (as viewed in FIGS. 4 and 4A, and shown by phantom line 69). In the upper position, the second support member 50 is generally coplanar with the upper surface 76 of the first support member 16. The second support member 50 can be urged into the upper position by any desired spring mechanism. As shown in FIGS. 4 and 4A, a torsion spring 70 is a preferred spring mechanism, although such is not required. Any other spring mechanism, such as an elastomeric member can also be used. Preferably, the second support member 50 is movable between the upper position, a lower position, as shown in FIGS. 4 and 4A, and a plurality of intermediate positions, such as shown in FIG. 7.

In operation, the upper platform 16 is first drawn outwardly from the housing 12 to the deployed position, as shown in FIGS. 1 and 2. In the deployed position, the holder 10 can support objects having a variety of diameters, and circumferential shapes and sizes. An object, such as a cup or bottle 72 for example, can inserted into the object support opening 18, such that a lower portion of the bottle is supported by the lower platform 34, as shown in FIGS. 4 and 7. Preferably, a portion of an outer surface of the bottle 72 contacts, and is supported by, the first contact surface 22.

Figure 6:
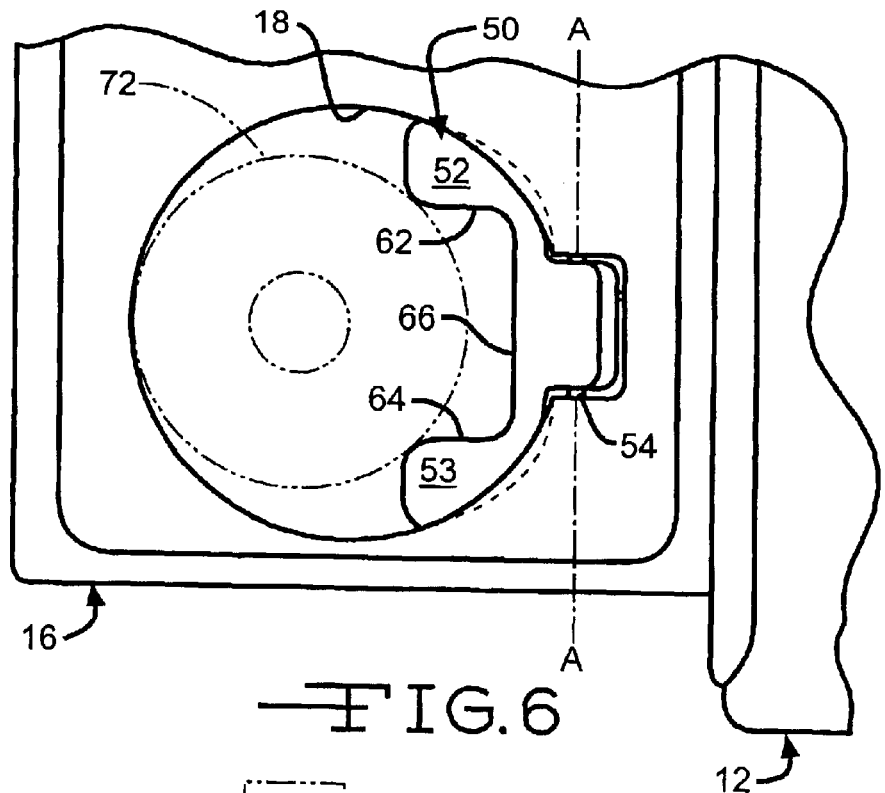
FIG. 6 is a partial plan view, partially in cross section, of an object support opening illustrated in FIG. 1 showing the second support member in an intermediate position.
Figure 7:
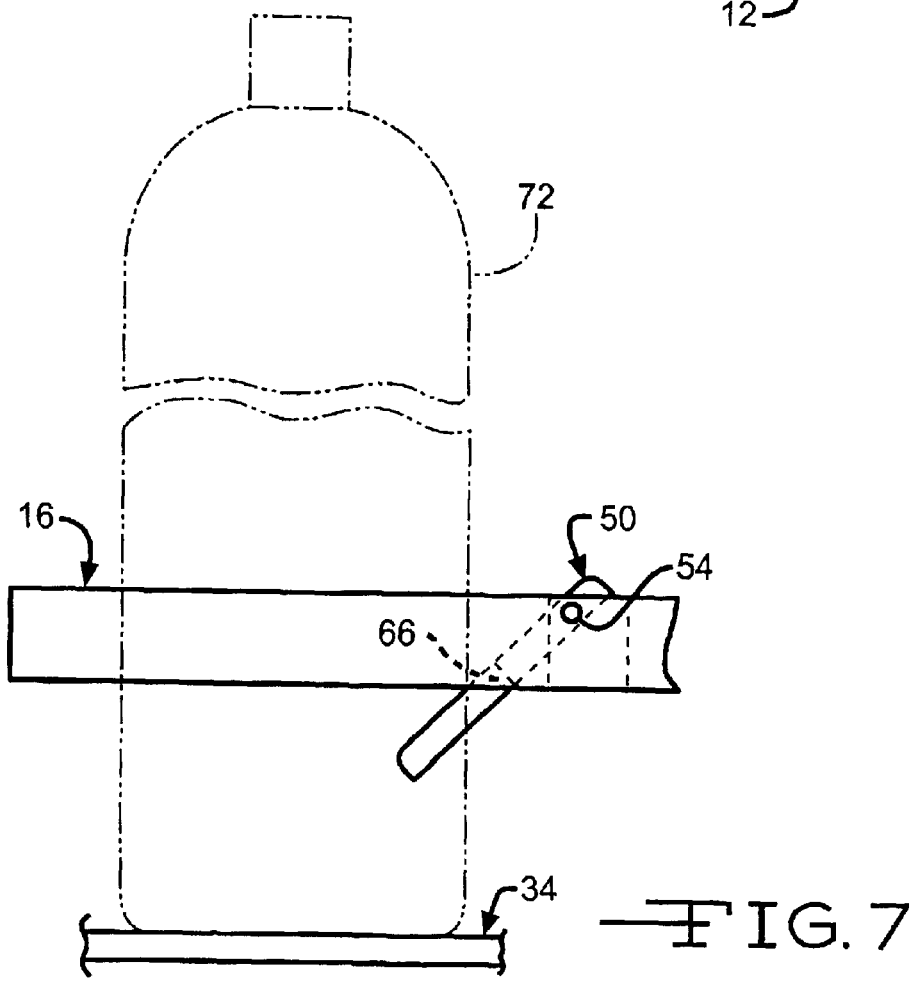
FIG. 7 is a partial view in elevation of the first and second support members illustrated in FIG. 6 showing the second support member in an intermediate position.

An important aspect of the invention is that at all intermediate positions, such as illustrated in FIGS. 6 and 7, the object contacts, and is thereby supported by, at least three points of contact with the multi-purpose holder 10. (e.g. between the object and the first contact surface 22, second contact surface 58, and third contact surface 60, respectively). When the object, such as the bottle 72, has a diameter, or circumferential size, larger than a distance between the support surfaces 62 and 64 of the arms 52 and 53, respectively, and is positioned within the object support opening 18, the second support member 50 provides additional support. When such a bottle 72, pushes against the second support member 50, the bottle 72 urges the second support member 50 against the force of the spring 70, causing the support member 50 to pivot toward the intermediate position, as shown in FIGS. 6 and 7. Preferably, the second support member 50 pivots about the axis A. Such pivoting of the second support member 50 thereby alters the position of the second contact surface 58, and the third contact surface 60 relative to the bottle 72. In the intermediate position, the bottle is preferably in contact with, and supported by, the first contact surface 22, second contact surface 58, and third contact surface 60. Accordingly, an object having a diameter, or circumferential size equal or smaller than the object support opening 18, but larger than a distance between the support surfaces 62 and 64, can be inserted and supported within the opening 18 by the first, second, and third contact surfaces 22, 58, and 60, respectively.

Significantly, objects having irregular circumferential shapes can be easily and conveniently supported by the second support member. Such objects can include an object having substantially rectangular circumferential cross section, such as a conventional cellular telephone, or a beverage box 74, as shown in FIGS. 1 and 2. When the beverage box 74 has a width w smaller than the distance between the support surfaces 62 and 64 of the arms 52 and 53, respectively, the support surfaces 62, 64, and 66 can provide support for the beverage box. The object, such as beverage box 74, can contact any one of or all of the support surfaces 62, 64, and 66.

The principle and mode of operation of this invention have been described in its preferred embodiments. However, it should be noted that this invention may be practiced otherwise than as specifically illustrated and described without departing from its scope.

What is claimed is:

1. A multi-purpose holder for supporting an object in a vehicle comprising:
   a first support member defining an opening for receiving an object, said first support member having a first contact surface for supporting the object;
   a second support member pivotally mounted on said first support member, said second support member having a notch formed therein defining second and third contact surfaces, wherein said first, second, and third contact surfaces define three distinct contact points for laterally supporting the object received in said opening; and
   a lower platform for vertically supporting a lower portion of an object laterally supported by said first support member, wherein said lower platform is vertically movable.

2. The multi-purpose holder according to claim 1, wherein said first contact surface is an edge forming said opening in said first support member.

3. The multi-purpose holder according to claim 1, wherein said first support member is slidably mounted within a housing.

4. The multi-purpose holder according to claim 1, wherein said second support member is substantially rigid and pivotally mounted on said first support member by a pivot pin extending from one of said first support member and said second support member, said pivot pin being received in an aperture formed on the other one of said first support member and said second support member.

5. The multi-purpose holder according to claim 1, said second support member being pivotal to alter the position of said second and third contact surfaces such that said second and third contact surfaces support, in cooperation with said first contact surface, objects having different diameters.

6. The multi-purpose holder according to claim 1, wherein the opening in said first support member has a substantially cylindrical shape.

7. The multi-purpose holder according to claim 1, further including a spring for biasing said second support member toward an upper position for supporting an object between said second and third contact surfaces, said second support member being movable between said upper position, a lower position, and an intermediate position, said intermediate position being between said upper position and said lower position.

8. The multi-purpose holder according to claim 7, wherein said second support member is generally coplanar with an upper surface of said first support member when said second support member is in said upper position.

9. The multi-purpose holder according to claim 7, said second support member adapted to move from said upper position to said intermediate position when an object having a diameter larger than the distance between said second and third contact surfaces, said holder being configured such that the object is in contact with said first contact surface of said first support member, the object further being in contact with said second and si third contact surfaces of said second support member.

10. The multi-purpose holder according to claim 1, wherein said second support member is substantially wishbone-shaped.

11. A multi-purpose holder for supporting an object in a vehicle comprising:
   a housing for mounting in a vehicle;
   a first support member defining an opening for receiving an object, said first support member having a first contact surface for supporting the object, said first support member being slidably mounted within said housing;
   a second support member pivotally mounted on said first support member, said second support member having a notch formed therein defining second and third contact surfaces, wherein said first, second, and third contact surfaces define three distinct contact points for laterally supporting the object received in said opening; and a lower platform for supporting a lower portion of an object supported by said first support member, wherein said lower platform is vertically movable.

12. The multi-purpose holder according to claim 11, said second support member being pivotal to alter the position of said second and third contact surfaces such that said second and third contact surfaces support, in cooperation with said first contact surface, objects having different diameters.

13. The multi-purpose holder according to claim 11, wherein said second support member is substantially wishbone-shaped.

14. The multi-purpose holder of claim 1, wherein said notch is generally rectangular in shape.

15. The multi-purpose holder of claim 11, wherein said notch is generally rectangular in shape.

* * * * *